United States Patent Office 2,891,859
Patented June 23, 1959

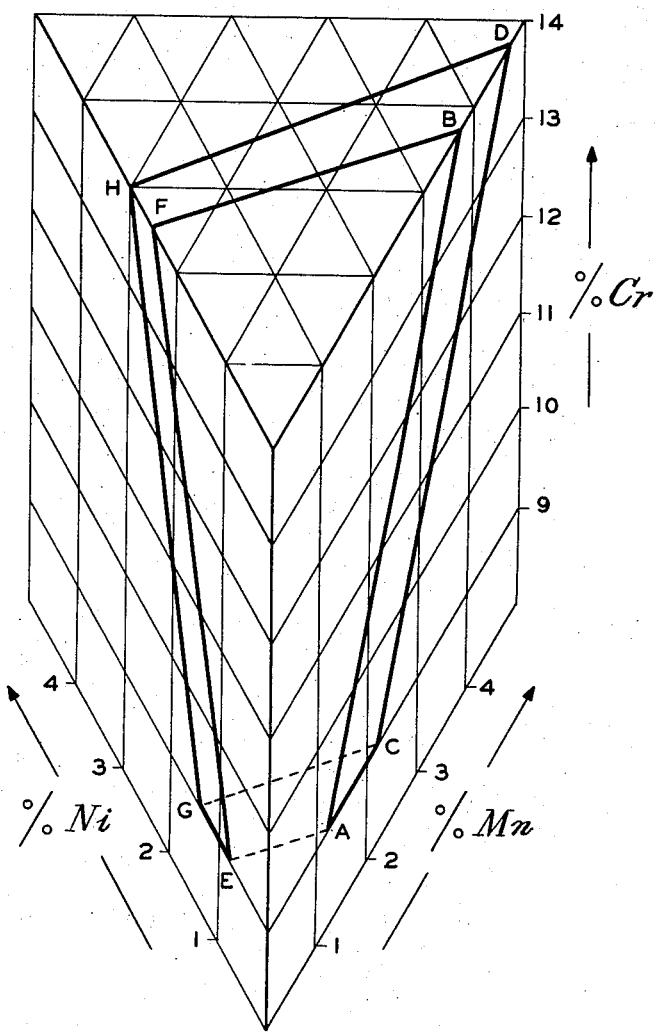
|  | GHDC | EFBA |
|---|---|---|
| CARBON | 0.03 % | 0.05 % |
| NITROGEN | 0.01 % | 0.03 % |

2,891,859
ALLOY STEEL

Wesley R. Kegerise, Reading, Pa., assignor to The Carpenter Steel Company, Reading, Pa., a corporation of New Jersey Application April 26, 1957, Serial No. 655,392

8 Claims. (Cl. 75—128)

This invention relates to a weldable alloy steel with low hardness as heat treated and more particularly to such a composition capable of having a martensitic microstructure essentially free of ferrite even in the weld zone.

A stainless steel alloy is often required having seemingly conflicting properties. This is especially true in the case of compositions intended for use in parts which are to be welded where it is also necessary that the part have a high degree of resistance to corrosion at operating temperatures in a corrosive atmosphere such as steam as well as good hot strength. In the case of stainless steel partitions or blades in steam turbines the composition should not only embody the foregoing properties but must also be inexpensive.

Compositions intended for use in the fabrication of such parts as steam turbine partition or blade members advantageously are hardenable. During the welding of such members, the portion of the member adjacent to the weld region is affected by heat and may harden to an objectionable degree. It has been found that in the event the zone affected by the heat of the welding process attains thereby a hardness in excess of Rockwell C-38 the part is susceptible to weld cracking which then often occurs.

Hitherto, compositions which were considered as suitable to meet the foregoing criteria had been limited. Two commonly utilized compositions have the following percent composition by weight, the remainder being iron:

|       | C    | Mn   | Si   | P    | S    | Cr    | Ni   | Al   | Cb     |
|-------|------|------|------|------|------|-------|------|------|--------|
| No. 1 | .07  | .40  | .25  | .020 | .025 | 13.50 | .12  |      | .40/.50|
| No. 2 | .06  | .45  | .35  | .025 | .023 | 13.70 | .15  | .20  |        |

The use of columbium in composition No. 1 rendered the composition expensive. Composition No. 2 has a microstructure containing a large amount of ferrite which may be as much as about 50%, and in addition to generally not being hardenable by heat treatment, does not have the desired degree of hot strength at elevated temperatures.

I have found that a composition range which hitherto would have been expected to be well within the region where a two-phase microstructure would result after welding, in fact has a single phase microstructure which is wholly martensitic or which at most contains no more than 5% ferrite, even after welding, and incorporates to a greatly desired degree those properties which are essential to a weldable stainless steel.

It is, therefore, an object of this invention to provide an improved weldable stainless steel which has a martensitic microstructure, essentially free of ferrite after hardening, and which is characterized by good resistance at elevated temperatures to a deleterious atmosphere, such as steam.

Another object is to provide such a composition having good hot strength at elevated temperatures and improved resistance to weld cracking.

By my present invention I have unexpectedly found that my present alloy composition, though representing a range which normally would be expected to embody a two-phase microstructure after welding, in fact has a wholly single phase microstructure of martensite essentially free of ferrite. Alloys of my composition characteristically have only up to about 5% ferrite and show improved hot strength and resistance to weld cracking when compared, as for example, to composition No. 2. My compositions may be readily heat treated but do not attain a hardness in the zone affected by the heat of the welding process in excess of Rockwell C-38.

The single figure of the accompanying drawing is a three-dimensional diagram showing the minimum amounts of nickel and/or manganese utilized as chromium ranges from about 9% to 14% to provide a ferrite free microstructure; the values represented by the quadrilateral EFBA being based upon approximately maximum amounts of carbon and nitrogen, the values represented by the quadrilateral GHDC being based upon approximately minimum amounts of carbon and nitrogen.

In order to insure that my composition has good corrosion resistance, particularly when utilized as a turbine partition member or blade intended for operation in a steam atmosphere, a minimum of 9% chromium is required. While I preferably utilize about 12% chromium, the chromium content may range up to about 14%. Above about 15% chromium there may be difficulty in annealing as well as the possibility of the formation of a brittle intermetallic compound known as sigma. Furthermore, the additional manganese and nickel required to maintain a microstructure free from ferrite in the weld zone become excessive.

With a range of about 9% to about 14% chromium, the carbon and nitrogen contents largely control the hardenability of the composition. With decreasing carbon and nitrogen content the hardness decreases. In order to insure that the zone affected by heat during welding cannot exceed about Rockwell C-38, the carbon and nitrogen contents must be carefully controlled and are preferably limited to about .05% carbon and about .03% nitrogen. Slightly larger amounts of carbon and nitrogen, no more than about .06% and .04% respectively, may not be objectionable. However, from the welding operation, the heat affected zone attains a hardness higher than either the parent metal or the as cast weld metal and excessive hardness in this zone must be avoided. I preferably utilize about .03% to about .05% carbon and about .01% to about .03% nitrogen, bearing in mind that the amount of carbon and nitrogen together should be from about .04% up to about .08% to avoid exceeding a hardness in the heat affected zone of about Rockwell C-38. With less than .03% carbon and .01% nitrogen somewhat larger amounts of nickel and/or manganese are required to prevent substantial formation of ferrite at the various chromium levels.

Either nickel or manganese or both together are present in my composition to provide an alloy which when welded is substantially free from ferrite in the weld zone. For this purpose nickel appears to be more effective than manganese and may be utilized in smaller quantities. The required amounts of manganese or nickel necessary to maintain a martensitic structure are also governed by the quantity of the ferrite forming chromium present as well as the amount of silicon present which is also a ferrite forming element. In my composition silicon, though desirable as a deoxidizing element during the melting process, is present in an amount consistent with good melting practice, up to about .40%, because of its tendency to produce ferrite. Substantially the minimum amounts of nickel and manganese are shown in the three-dimensional diagram in which the percent of chromium is shown along the vertical scale. The percentage of nickel required as a minimum is shown along the lefthand horizontal scale while that of manganese is shown along the righthand horizontal scale. The quadrilaterals EFBA and GHDC are plotted for compositions containing .40% silicon. The amounts of nickel and/or manganese lying in the plane EFBA are about the minimum amounts required for the corresponding amounts of chromium ranging from 9% to 14% and with .05% carbon and .03% nitrogen. Thus, the amount of nickel represented by point E is .30% while the amount of manganese represented by point A is 1.2% and these are equivalent and minimum amounts either of which may be utilized with 9% chromium, .40% silicon, .05% carbon and .03% nitrogen. The dotted line joining points E and A indicates that nickel and manganese may be utilized together if desired and in amounts corresponding to the position along the line EA. For example, the point midway between E and A represents the composition having the stated amounts of the other elements together with .40% nickel and .60% manganese. Similarly, 2.5% nickel represented by point F is equivalent to 3.7% manganese represented by point B in compositions containing 14% chromium. Moving along the line FB, from left to right, the amount of nickel decreases proportionally from 2.5% while the amount of manganese increases proportionally to 3.7%.

The plane GHDC shows the minimum amounts of nickel and/or manganese required for the corresponding amounts of chromium which range from 9% to 14% and with .03% carbon and .01% nitrogen. With this amount of carbon and nitrogen and at the 9% chromium level, 1.40% nickel, point G, and 2.2% manganese, point C, are equivalent minimum amounts of either required. At the 14% chromium level 3% nickel, point H, and 4.7% manganese, point D, are equivalent minimum amounts of either required.

Any point on or within the six sided solid figure shown in the diagram as being bounded by the plane EFBA on one side and the plane GHDC on the opposite side when plotted by means of the coordinates provided gives a composition having the desired properties; the diagram being constructed so as to define the limits for a ferrite free microstructure. For practical purposes it should be noted that normal melting practices result in a residual amount of nickel of about .15% and a residual amount of manganese of about .25% which should be taken into account when considering the minimum amounts of either of these elements required alone.

A given percent of nitrogen is about one and one-half times as effective as an equal percent of carbon in stabilizing the microstructure of these compositions. Consequently, if the aggregate percent of carbon and nitrogen is reduced due to a reduction in the nitrogen content then a correspondingly larger addition of nickel or a correspondingly even larger addition of manganese is required than when the reduction is due to a decrease in the carbon content.

Larger amounts of nickel and/or manganese may be utilized than the minimum values shown for the various chromium levels, however, when utilizing larger amounts of these elements care must be taken not to increase the nickel and/or manganese content to such a degree as to result in any retained austenite. A two-phase microstructure resulting from the presence of retained austenite is undesirable since the austenite would cause points of weakness from the standpoint of stress rupture and corrosion. Generally, the nickel and/or manganese contents may be increased from 1% up to about 2% above the minimum values for the various chromium levels.

One specific composition of my novel alloy, conveniently designated as No. 982, has the following percent composition by weight, the remainder being iron:

| | |
|---|---|
| Carbon | .033 |
| Manganese | .48 |
| Silicon | .32 |
| Chromium | 11.68 |
| Nickel | 1.45 |
| Nitrogen | .022 |

Here as elsewhere the expression "remainder iron" is intended to designate that the composition is as set forth in accordance with standards of purity which are considered acceptable in normal commercial practice, however, it is not intended to exclude the possibility that additional alloying elements which do not adversely affect the desired properties as set forth herein may be added. A melt of composition No. 982 was cast into a 3 inch ingot and was processed by forging and rolling into a ¾ inch square bar. The composition was unexpectedly found to be wholly martensitic without an observable trace of ferrite after being heated to an elevated temperature even though in accordance with the well known Schaeffler Diagram, published in "Metals Progress," vol. 56, 1949, page 689, in an article entitled "Constitution Diagram for Stainless Steel Weld Metal" by A. L. Schaeffler, the percentage of the alloying ingredients in composition No. 982 places it well within the two-phase martensitic-ferritic portion of the diagram. Composition No. 982 is relatively inexpensive particularly when compared to the prior art type No. 1 which contains an appreciable amount of columbium but yet has a highly desired degree of hot strength and a maximum hardness, as heat treated by oil quenching from 1800° F., of 33 on the Rockwell C scale. When welded, the heat affected zone of parts fabricated from No. 982 has a hardness below Rockwell C-38, thereby permitting the part to be readily welded and to be free of the drawback of being sensitive to weld cracking. At 1000° F., this composition has a life of 1000 hours at a stress of 25,000 p.s.i.

Composition No. 983 has a nickel content of 2.15% while in other respects is substantially identical with composition No. 982. A ¾ inch square bar processed as is described in connection with that formed of composition No. 982 also had a martensitic microstructure free of ferrite with a maximum hardness as heat treated of 33 on the Rockwell C scale.

The compositions set out in the following tables demonstrate the careful balance between the constituent elements required to produce my present composition, the remainder being iron:

| No. | C | Mn | Si | Cr | Ni | N | Heat Affected Area RC | Percent Ferrite In Weld Area |
|---|---|---|---|---|---|---|---|---|
| 333 | 0.032 | 1.02 | 0.21 | 11.75 | 0.17 | 0.030 | 27/29 | 20%. |
| 334 | .026 | 1.42 | .28 | 11.57 | .18 | .026 | 32/33 | 10/20%. |
| 335 | .024 | 1.90 | .24 | 11.59 | .16 | .026 | 28/30 | trace to 5%. |
| 336 | .028 | 2.36 | .28 | 11.55 | .18 | .030 | 31/33 | nil to trace. |
| 981 | .033 | .48 | .32 | 11.68 | .74 | .022 |  | 10/15%. |

Compositions No. 333 and No. 334 are included to show the criticallity of the manganese content with approximately residual nickel. In No. 333, 1.02% manganese was insufficient to prevent the formation of excessive ferrite in the presence of 11.75% chromium and with .032% carbon and .030 nitrogen. In No. 334, 1.42% manganese was ineffective in the presence of 11.57% chromium and with .026% carbon and .026% nitrogen. Samples of composition No. 333 in the area affected by the heat of the welding process had hardnesses of 27 to 29 Rockwell C but showed about 20% ferrite in the weld area. Samples of composition No.

334 gave corresponding values of 32 to 33 Rockwell C and 10 to 20% ferrite.

On the other hand, No. 335 and No. 336 when similarly processed and treated had hardnesses in the heat affected area of Rockwell C 28–30 and 31–33 respectively and showed respectively from a trace to 5% and from nil to a trace of ferrite in the weld area after welding with a helium arc.

In composition No. 981, with such carbon and nitrogen contents in the presence of 11.68% chromium, excessive ferrite results in the weld zone with only little more than residual manganese and .74% nickel.

Melts having compositions as set forth in the following table were cast into 1⅛ inch square ingots and were processed by forging to ¼ inch square. Each of the specimens was heat treated by oil quenching from 1750° F. Multiple tests were carried out on specimens having compositions as indicated after subjecting each to a welding arc in a helium atmosphere to form a weld bead therealong. In the "Heat Affected Area RC" column there is set forth the hardness values, Rockwell C, obtained from the zone adjacent to the weld and affected by heat from the welding process. Under "Weld Area RC" there is tabulated the hardness values obtained from the weld area, that is to say, the metal fused during the welding process. Under "Percent ferrite in the weld area" the results obtained from an examination of the microstructure are set forth.

|  | C | Mn | Si | Cr | Ni | N | Heat affected Area RC | Weld area RC | Percent ferrite in the Weld Area |
|---|---|---|---|---|---|---|---|---|---|
| No. 380 | 0.044 | 0.32 | 0.29 | 10.12 | 1.30 | 0.019 | 33/35 | 30/31 | nil. |
| No. 381 | .060 | .41 | .29 | 10.34 | 1.73 | .022 | 38 | 37 | nil. |
| No. 382 | .044 | .38 | .32 | 14.42 | 2.32 | .031 | 38/39 | 39 | 5/10. |
| No. 383 | .054 | .41 | .29 | 14.76 | 2.79 | .036 | 40 | 37 | 5. |
| No. 384 | .038 | .30 | .29 | 14.88 | 3.37 | .032 | 38 | 36/37 | nil. |
| No. 408 | .046 | .38 | .19 | 9.07 | 1.02 | .019 | 35 | 33 | trace. |
| No. 409 | .048 | .38 | .18 | 9.06 | 1.29 | .019 | 34/35 | 31 | trace. |
| No. 410 | .048 | .38 | .22 | 9.14 | 1.78 | .019 | 35 | 28/30 | nil. |
| No. 411 | .044 | .41 | .22 | 13.12 | 2.33 | .023 | 37/38 | 36 | nil. |
| No. 412 | .044 | .41 | .23 | 13.10 | 2.84 | .022 | 37 | 35 | nil. |
| No. 413 | .052 | .41 | .20 | 13.20 | 3.41 | .023 | 37 | 31/33 | nil. |
| No. 454 | .040 | .31 | .11 | 9.27 | .72 | .007 | 36 | 34 | 5. |
| No. 455 | .037 | .43 | .16 | 13.38 | 1.91 | .027 | 37 | 35 | 10. |

Composition No. 381 while not having an excessive hardness in the heat affected area, is harder than preferred due to the large carbon and nitrogen content. Composition No. 382 demonstrated approximately the same hardness but showed excessive ferrite in the weld area due to the insufficient amounts of nickel and manganese. Composition No. 383 contains an excessive amount of carbon and nitrogen, together totalling .09% and while not showing excessive ferrite in the weld area, does have excessive hardness in the heat affected zone. Composition No. 384 has a tolerable, though high, hardness in the heat affected area but contains sufficient nickel with the approximately residual manganese as indicated by the absence of ferrite in the weld area. Composition No. 455 shows the effect of insufficient quantities of nickel and manganese with an excessive amount of ferrite in the weld area.

It is to be noted that due to the extreme high temperature to which the weld metal or the metal in the weld area is subjected, from about 2,500° F. to 2,700° F., there is by far the greatest possibility of the formation of free ferrite in that region than elsewhere. A composition which may remain wholly martensitic when subjected to treatments at such intermediate temperatures as 1500° F. to 2,000° F. may, nevertheless, show excessive free ferrite in the region thereof subjected to the higher temperature of the welding process.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An alloy steel which when welded is capable of having a martensitic microstructure in the weld area substantially free of retained austenite and containing no more than about 5% ferrite and capable of having a hardness in the heat affected area adjacent to the weld no greater than about Rockwell C–38, said steel comprising about 9 to about 14% chromium, up to about .40% silicon, from about .02% to about .06% carbon, from about .01% to about .04% nitrogen, with the aggregate amount of carbon and nitrogen being no greater than about .08% to limit the hardness, up to about 4% nickel and up to about 6% manganese, the remainder being substantially iron, and in which the minimum content of nickel and manganese is at least substantially as defined by plane EFBA and in relation to the chromium content and the carbon and nitrogen content is as defined by the volume bounded by plane EFBA and plane GHDC delineated in the drawing, said drawing being based upon a ferrite-free microstructure.

2. A steam turbine part such as a partition, blade or the like consisting of an alloy steel which when welded is capable of having a martensitic microstructure in the weld area substantially free of retained austenite and containing no more than about 5% ferrite and capable of having a hardness in the heat affected area adjacent to the weld no greater than about Rockwell C–38, said steel comprising about 9 to about 14% chromium, up to about .40% silicon, from about .02% to about .06% carbon, from about .01% to about .04% nitrogen, with the aggregate amount of carbon and nitrogen being no greater than about .08% to limit the hardness, up to about 4% nickel and up to about 6% manganese, the remainder being substantially iron, and in which the minimum content of nickel and manganese is at least substantially as defined by plane EFBA and in relation to the chromium content and the carbon and nitrogen content is as defined by the volume bounded by plane EFBA and plane GHDC delineated in the drawing, said drawing being based upon a ferrite-free microstructure.

3. An alloy steel which when welded is capable of having a martensitic microstructure in the weld area substantially free of retained austenite and containing no more than about 5% ferrite and capable of having a hardness in the heat affected area adjacent to the weld no greater than about Rockwell C–38, said steel comprising about 11% to about 12% chromium, up to about .40% silicon, about .03% carbon, about .02% nitrogen, about 1.5% nickel, about .5% manganese and the remainder substantially iron.

4. A steam turbine part such as a partition, blade or the like consisting of an alloy steel which when welded is capable of having a martensitic microstructure in the weld area substantially free of retained austenite and containing no more than about 5% ferrite and capable of having a hardness in the heat affected area adjacent to the weld no greater than about Rockwell C–38, said steel comprising about 11% to about 12% chromium, up to about .40% silicon, about .03% carbon, about .02% nitrogen, about 1.5% nickel, about .5% manganese and the remainder substantially iron.

5. An alloy steel which when welded is capable of having a matensitic microstructure in the weld area substantially free of retained austenite and containing no more than about 5% ferrite and capable of having a hardness in the heat affected area adjacent to the weld no greater than about Rockwell C–38, said steel comprising about 11% to about 12% chromium, up to about .40% silicon, about .03% carbon, about .02% nitrogen, about .15% nickel, about 2.4% manganese and the remainder substantially iron.

6. A steam turbine part such as a partition, blade or the like consisting of an alloy steel which when welded is capable of having a martensitic microstructure in the weld area substantially free of retained austenite and containing nom ore than about 5% ferrite and capable of having a hardness in the heat affected area adjacent to the weld no greater than about Rockwell C-38, said steel comprising about 11% to 12% chromium, up to about .40% silicon, about .03% carbon, about .02% nitrogen, about .15% nickel, about 2.4% manganese and the remainder substantially iron.

7. An alloy steel which when welded is capable of having a martensitic microstructure in the weld area substantially free of retained austenite and containing no more than about 5% ferrite and capable of having a hardness in the heat affected area adjacent to the weld no greater than about Rockwell C-38, said steel comprising about 11 to about 12% chromium, up to about .40% silicon, from about .02% to about .06% carbon, from about .01% to about .04% nitrogen, with the aggregate amount of carbon and nitrogen being no greater than about .08% to limit the hardness, up to about 4% nickel and up to about 6% manganese, the remainder being substantially iron, and in which the minimum content of nickel and manganese is at least substantially as defined by plane EFBA and in relation to said chromium content is as defined by the volume bounded by plane EFBA and plane GHDC delineated in the drawing, said drawing being based upon a ferrite-free microstructure.

8. An alloy steel which when welded is capable of having a martensitic microstructure in the weld area substantially free of retained austenite and containing no more than about 5% ferrite and capable of having a hardness in the heat affected area adjacent to the weld no greater than about Rockwell C-38, said steel comprising about 11% to about 12% chromium, up to about .40% silicon, about .03% carbon, about .02% nitrogen, up to about 4% nickel and up to about 6% manganese the remainder being substantially iron, and a minimum amount of nickel and manganese in relation to the chromium content substantially as delineated in the drawing, said drawing being based upon a ferrite-free microstructure.

References Cited in the file of this patent
UNITED STATES PATENTS

| | | |
|---|---|---|
| 2,306,421 | Arness | Dec. 29, 1942 |
| 2,695,229 | Sheridan et al. | Nov. 23, 1954 |